United States Patent [19]

Lewis et al.

[11] Patent Number: 4,807,661

[45] Date of Patent: Feb. 28, 1989

[54] FLUID CONTROL VALVE

[76] Inventors: Joel Lewis, 2218 Glen Haven; Harry Lewis, 2217 Maroneal, both of Houston, Tex. 77030

[21] Appl. No.: 128,729

[22] Filed: Dec. 4, 1987

[51] Int. Cl.[4] .............................................. F16K 17/00

[52] U.S. Cl. ................................ 137/456; 137/624.12

[58] Field of Search ....................... 137/624.11, 624.12, 137/456; 73/223

[56] References Cited

U.S. PATENT DOCUMENTS

| | | | |
|---|---|---|---|
| 4,051,715 | 10/1977 | Ledeen et al. | 137/456 X |
| 4,249,565 | 2/1981 | Brust | 137/495 |
| 4,252,088 | 2/1981 | Frisby . | |
| 4,355,654 | 10/1982 | Levesque et al. . | |
| 4,522,229 | 6/1985 | Van de Moortele . | |
| 4,589,435 | 5/1986 | Aldrich | 137/624.11 X |

FOREIGN PATENT DOCUMENTS

| | | | |
|---|---|---|---|
| 2468069 | 4/1981 | France | 137/624.11 |

*Primary Examiner*—Stephen Hepperle
*Attorney, Agent, or Firm*—David M. Ostfeld

[57] ABSTRACT

An apparatus for controlling the flow of fluid through a conduit is disclosed. The conduit permits normal flow of fluid through the conduit and detects abnormal flow of fluid which is due to a catastrophic failure of the fluid system or is due to intermittent flow of fluid caused by a leak in the fluid system. The apparatus is particularly useful in determining the abnormal flow of fluid through conduits where the normal flow of flow is erratic. The apparatus can be modified to change the parameters defining abnormal flow in the system.

20 Claims, 2 Drawing Sheets

FLUID CONTROL VALVE

FIELD OF THE INVENTION

The present invention relates to a valve for controlling the flow of a fluid through a conduit. More particularly, the present invention provides a fluid control valve which prevents the flow of fluid through the conduit when abnormal fluid flow is detected.

BACKGROUND OF THE INVENTION

Various devices have been developed to detect the flow of fluids such as water. For example, devices have been developed to detect leaks in fluid carrying conduits and have been developed to monitor the level of fluids in tanks for storing fluids. For example, U.S. Pat. No. 4,355,654 to Levesque et al. discloses a device for monitoring the flow of fluid through a pair of conduits. The normal flow of fluid through the conduits is monitored, and the device blocks the flow of fluid through one conduit when leakage of fluid from the conduit is detected. The apparatus is particularly designed for dual control systems and only blocks the flow of fluid through one conduit so that the entire fluid system is not shut down. If both conduits are simultaneously damaged, the apparatus diverts all fluid to the less severely damaged conduit.

Other devices have been developed to detect fluid flow through a conduit. In U.S. Pat. No. 4,252,088 to Frisby, leaks in a fluid system are detected by magnetic switches engaged with a flapper which is displaced by movement of the fluid through the system. A thermal time delay switch prevents actuation of the magnetic switches due to slight variations in the fluid pressure. In U.S. Pat. No. 4,522,229 to Van de Moortele, an elaborate system of chambers and valves are arranged to stop the flow of the fluid when a leak in the fluid system is detected. Since slow leaks and catastrophic fluid leaks are detected with a combination of fluids in chambers, the device only works when it is oriented in a fixed orientation. This requirement limits the design flexibility of the apparatus and may render the apparatus useless in a moving environment.

None of these devices provide a comprehensive solution to the problem of detecting abnormal fluid flow to an appliance such as a toilet. In an appliance, as in certain industrial uses, the normal flow of fluid through a conduit may be intermittent and failure of the fluid carrying system can occur in different ways. For example, failure of the ballcock in a toilet tank may result in a rapid loss of water. If the stopper in the bottom of the tank leaks, slow and intermittent fluid flow may result in a significant water loss over a period of time. Detection of a rapid loss of water, or of an intermittent flow, is difficult since water normally flows through the conduit in an intermittent fashion. If the abnormal fluid flow is not quickly detected, a significant amount of fluid can be lost before the leak is identified and corrected.

Accordingly, a need exists for a fluid control apparatus which detects unusual flow of a fluid through a conduit and selectively prevents the flow of fluid through the conduit after the abnormal flow is detected.

SUMMARY OF THE INVENTION

The present invention overcomes the disadvantages of the prior art by providing an apparatus which selectively prevents the flow of fluids through a conduit. A sensor detects the flow of fluid through the conduit and generates a signal. A valve for selectively preventing the flow through the conduit is engaged with the conduit. An engaging means connected between the sensor and the valve selectively activates the valve to prevent the flow of fluid through the conduit when a single continuous fluid flow exceeds a selected time interval, or when the cumulative sum of all individual fluid flows exceeds a selected amount within a predetermined time interval. In other embodiments of the invention, the engaging means can comprise a first timer and a second timer. The first timer selectively activates the valve to prevent fluid flow when the duration of each continuous fluid flow exceeds a selected time interval. A second timer measures the cumulative sum of individual fluid flows through the conduit over a predetermined time interval and activates the valve to prevent fluid flow. The first timer resets to time zero after each fluid flow which does not exceed the selected time interval, and the second timer resets to time zero if the cumulative sum of individual fluid flows within the predetermined time interval does not exceed the selected amount.

DESCRIPTION OF THE PREFERRED EMBODIMENTS

The present invention discloses a fluid control valve which regulates the fluid flow through a conduit. Briefly, the invention monitors the duration of continuous flow for each fluid flow and monitors the cumulative sum of fluid flows over a predetermined time interval. If the cumulative sum of fluid flows or a separate, individual flow exceed a selected value, a valve is activated to block the flow of fluid through the conduit.

Figure 1:
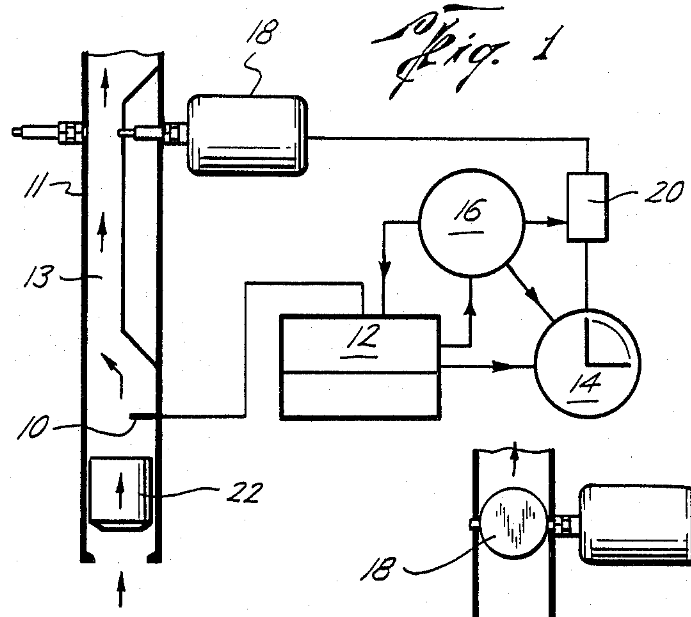
FIG. 1 illustrates a schematic drawing of the invention.

FIG. 1 illustrates one embodiment of the invention. As shown, sensor 10 is positioned in conduit 11, and detector 12 is linked with sensor 10 to detect signals generated by sensor 10. Sensor 10 is located in conduit 11 to detect the flow of fluid 13 through conduit 11. Sensor 10 can be one of many devices well known in the art which are capable of generating a signal, such as electrical current flow, when fluid 13 flows through conduit 11. In one embodiment of the invention, sensor 10 can comprise an impellor/generator (not shown) or similar mechanism which detects the flow of fluid 13 through conduit 11 or change in pressure of fluid 13 in conduit 11. Detector 12 is linked with a first timer 14 which measures the duration of each continuous fluid flow detected by sensor 10. Detector 12 is also linked with a second timer 16 which measures a predetermined interval of time. Timer 16 also measures the cumulative sum of all individual fluid flows over the predetermined interval of time. For example, this predetermined interval can be set at any convenient interval such as a one hour interval. Alternatively, the predetermined interval can be set at any other selected interval of time. Timer 16 measures the cumulative sum of the duration of all individual fluid flows within the predetermined time interval. More particularly, timer 16 determines whether the cumulative sum of all fluid flows within the predetermined time interval exceeds a selected amount. If the cumulative sum of all fluid flows is less than the selected amount, timer 16 will automatically reset to time zero at the end of the predetermined interval. The process is then repeated. If the duration of the cumulative sum of all fluid flows within the predetermined interval exceeds the selected amount, the flow of fluid 13 through conduit 11 will be blocked as described more thoroughly below.

Timer 14 can operate as a slave timer to timer 16 since the interval of time selected for timer 14 is preferably less than the interval of time selected for timer 16. Timer 14 will initially begin at time zero. In one embodiment of the invention, the selected interval of time is set at fifteen minutes. When sensor 10 detects a fluid flow period, timer 14 will run until sensor 10 detects that the continuous fluid flow has stopped. At such time, timer 14 will reset to time zero if the duration of the continuous fluid flow did not exceed the selected time interval. In a preferred embodiment of the invention, timer 14 will reset to time zero each time that timer 16 resets to time zero at the end of the longer, predetermined time interval. Timer 14 and timer 16 begin operating at the onset of the next fluid flow detected by sensor 10.

Figure 4:
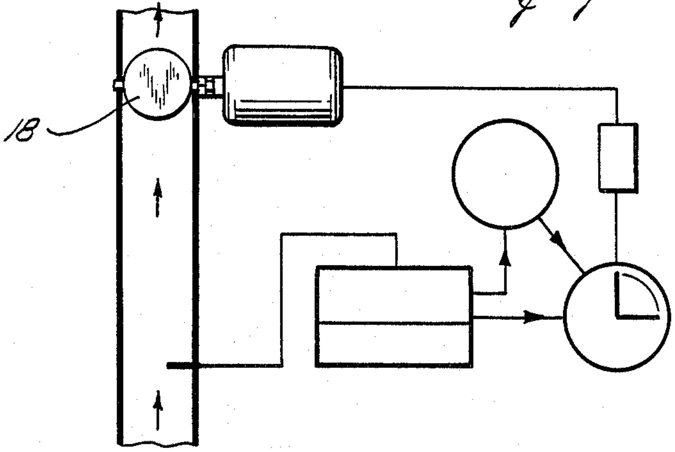
FIG. 4 illustrates a schematic drawing of the invention showing a ball valve, wherein all parts except the ball valve are the same as those for FIG. 1.
Figure 2:
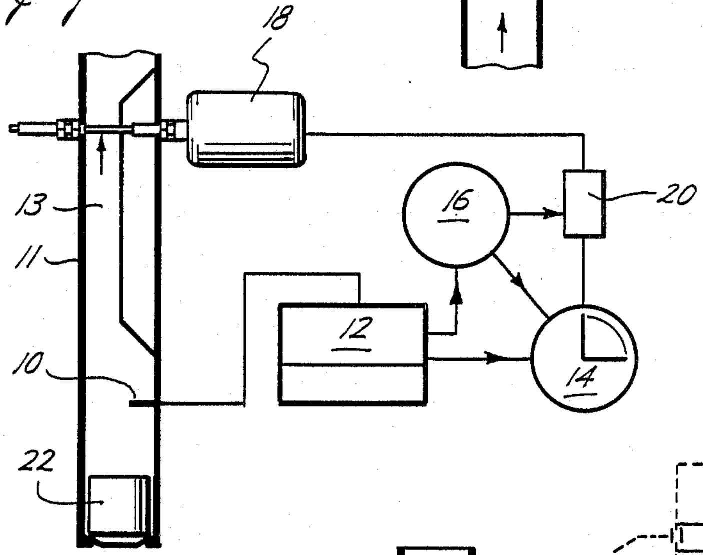
FIG. 2 illustrates a schematic drawing of the invention after the valve has been activated to prevent the flow of fluid through the conduit.
Figure 5:
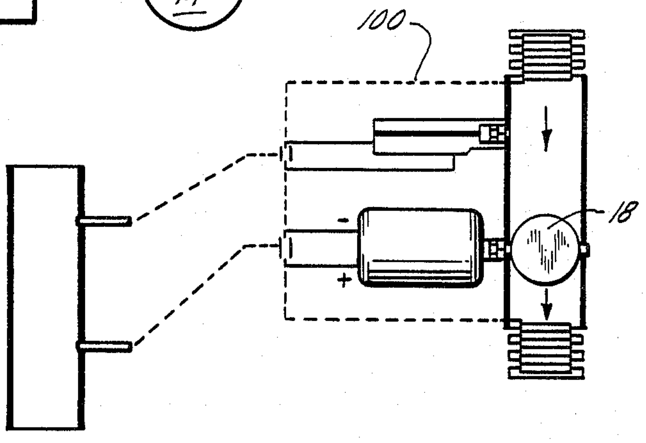
FIG. 5 illustrates a schematic drawing of the invention showing the system in a single package, wherein all parts except the ball valve are the same as those for FIG. 1.

In the event that a single continuous fluid flow exceeds the selected interval measured by timer 14, or if the cumulative sum of all individual fluid flows exceeds a selected amount within the predetermined time interval measured by timer 16, a fluid control valve 18 is selectively activated to prevent the flow of fluid 13 through conduit 11. In FIG. 1, valve 18 is shown as a solenoid valve. In FIGS. 4 and 5, valve 18 is shown as a ball valve. Referring to FIG. 2, valve 18 is illustrated as being activated to block the flow of fluid 13 through conduit 11. Valve 18 may be activated by a relay 20 which is triggered by timer 14 or timer 16. In a preferred embodiment of the invention, valve 18 can comprise a ball valve or any other type of valve well known in the art for preventing the flow of fluid through a conduit.

Check valve 22 is also located in conduit 11 to prevent the flow of fluid in a direction opposed to the usual direction of fluid flow. Preferably, check valve 22 is located upstream of sensor 10 in conduit 11 to isolate sensor 10 from variations in fluid pressure which are caused by other factors in the fluid carrying system which raise or lower the pressure of fluid 13 in conduit 11.

Figure 3:
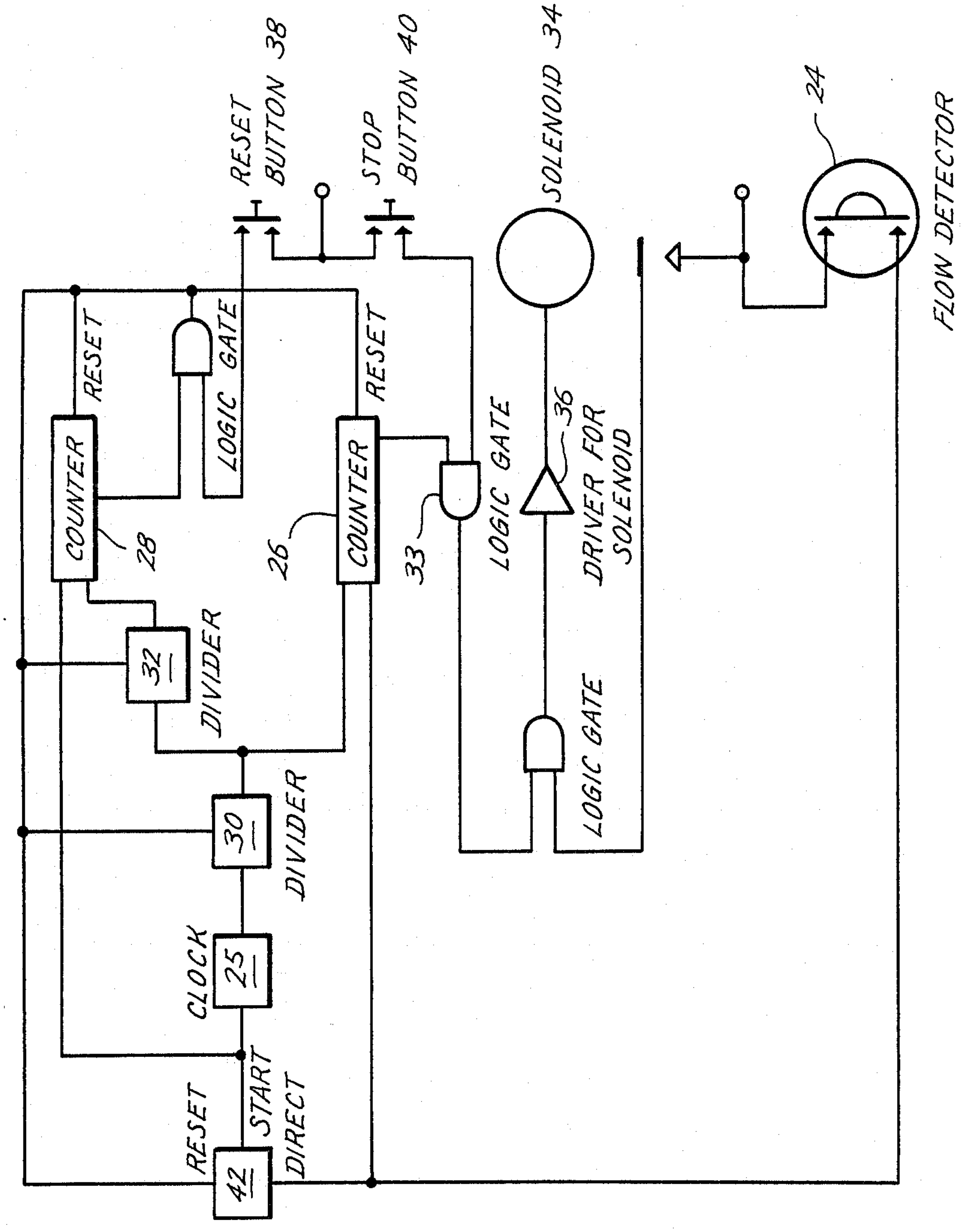
FIG. 3 illustrates a circuit of one embodiment of the present invention.

FIG. 3 illustrates a schematic of one embodiment of the present invention. Fluid flow is detected by the sensor, shown as flow detector 24. The signal or pulse generated by flow detector 24 activates clock 25 to generate a signal or pulse. This signal generated by clock 25 initiates the timers, shown as counters 26 and 28, to measure the duration of the signal. As shown, dividers 30 and 32 are linked between clock 25 and counters 26 and 28 to divide the signal generated by clock 24. In this fashion, the period of time measured by counters 26 and 28 can be selectively controlled. If the signal generated by flow detector 24 exceeds the parameters selected for counter 26 or counter 28, a signal may be sent through a logic gate 33 to activate the valve and to selectively block the flow of fluid through the conduit. In FIG. 3, the valve is illustrated as a solenoid 34 which is actuated by driver 36. In a preferred embodiment of the invention, dividers 30 and 32 can be manually altered, and counters 26 and 28 can be initialized with buttons such as reset button 38, which permit counters 26 and 28 to be reset manually. In another embodiment of the invention, an override device such as stop button 40 can be placed in the circuit to permit the manual closure of the fluid control valve. Reset devise 42 can be used to reactivate the entire system. The circuit can be powered by a conventional power source such as a battery (not shown). The period of time selected for the counters and clocks can be varied for the reasons previously described.

In operation, counter 28 can measure a predetermined time interval such as a one hour interval. Counter 26 is activated by the signal from clock 25 each time that flow detector 24 senses a fluid flow or change in pressure of fluid 13. When a single continuous flow exceeds a selected time interval, counter 26 will cause driver 36 to actuate solenoid 34 to prevent flow of fluid 13 through conduit 11. If the cumulative sum of individual fluid flows measured by counter 26, within the predetermined time interval measured by counter 28, exceeds a selected amount, counter 26 will activate driver 36 as set forth above to prevent flow of fluid 13. If a single continuous fluid flow, or the cumulative sum of flows, does not exceed the selected amounts within the predetermined time interval measured by counter 28, counter 28 will reset to zero time and counter 26 will also be reset to zero time. As previously described, reset button 38 can manually reset counters 26 and 28 to time zero. Counters 26 and 28 are then reactivated by the signal which detects the next fluid flow or change in fluid pressure.

The present invention furnishes a unique fluid control valve which permits normal fluid flow through a conduit while detecting fluid flow through the conduit which is characterized as abnormal. The apparatus can detect catastrophic failure of the system and can detect intermittent errors in the flow of fluid which can accumulate to a undesirable level. It is apparent that many variations to the embodiments shown herein may be made. For example, different types of sensors can be used to detect the flow of fluid through the conduit and to generate a signal. The nature of the signal generated can be modified depending on the engaging means used to activate the valve. The configuration of the engaging means can be varied, depending on the nature of the normal fluid flow through the conduit, to sense those flows which are characterized as abnormal. In addition, the invention can be connected to an alarm to signal closure of the valve. For example, the closure of the valve to prevent water flow through the conduit could signal an alarm which would notify an operator of the failure of the water system. In a residential application, the alarm could be connected with an alarm system used to detect other variables. Moreover, the apparatus could be connected at the water meter of a residence or commercial facility to detect abnormal flow of water or other fluid from the meter to the facility.

The type of valve used to prevent flow of fluid through the conduit can comprise any type of valve well known in the art, and the valve can be activated by different mechanisms which are driven by the engaging means or are included within the engaging means. The sensor and valve can be located in the same conduit section to permit the ready installation of the invention. As shown in FIG. 5, if desired, the sensor, valve, and means for engaging the valve can be integrated with a conduit section to form a single package 100 which is installed in-line with the conduit. In this embodiment, the sensor, valve, and other components of the apparatus can be integrated into a unitary apparatus which is connected to the conduit.

The apparatus described above is merely illustrative of the present invention. Many other variations of the apparatus may be made without departing from the scope of this invention. It is understood that the details shown herein are to be interpreted as explanatory and not in a limiting sense.

What is claimed is:

1. An apparatus for selectively preventing the flow of a pressurized fluid through a conduit, comprising:

a sensor for generating a signal as the fluid flows through the conduit;

a valve for selectively preventing the flow of the fluid through the conduit; and engaging means connected between said sensor and said valve for selectively activating said valve to prevent flow of the fluid when a continuous fluid flow exceeds a selected time interval and for selectively activating said valve to prevent flow of the fluid when the cumulative sum of individual fluid flows within a predetermined time interval exceeds a selected amount.

2. An apparatus as recited in claim 1, wherein said engaging means comprises a first timer for timing the duration of the predetermined time interval and further comprises a second timer for timing the duration of each continuous fluid flow and for assessing the cumulative sum of individual fluid flows over the predetermined time interval.

3. An apparatus as recited in claim 1, wherein said engaging means comprises a first timer for timing the duration of each continuous fluid flow, and further comprises a second timer for assessing the cumulative sum of individual fluid flows over a predetermined time interval.

4. An apparatus as recited in claim 3, wherein said first timer resets to time zero if a fluid flow does not exceed the selected time interval.

5. An apparatus as recited in claim 3, wherein said second timer resets to time zero at the end of the predetermined time interval if the cumulative sum of individual fluid flows within the predetermined time interval does not exceed the selected amount.

6. An apparatus as recited in claim 1, further comprising a check valve positioned upstream of said sensor in the conduit.

7. An apparatus for selectively preventing the flow of a pressurized fluid through a conduit, comprising:

a sensor for generating a signal as the fluid flows through the conduit;

a valve for selectively preventing the flow of the fluid through the conduit;

a first timer connected between said sensor and said valve for selectively activating said valve to prevent flow of fluid when said sensor detects a single, continuous fluid flow which exceeds a selected time interval; and a second timer connected between said sensor and said valve for selectively activating said valve to prevent flow of fluid when the cumulative sum of individual fluid flows within a predetermined time interval exceeds a selected amount.

8. An apparatus as recited in claim 7, wherein said first timer resets to time zero if a fluid flow does not exceed the selected time interval.

9. An apparatus as recited in claim 7, wherein said second time resets to time zero at the end of the predetermined time interval if the cumulative sum of individual fluid flows within the predetermined time interval does not exceed the selected amount.

10. An apparatus as recited in claim 9, wherein said first timer resets to time zero when said second timer resets to time zero.

11. An apparatus as recited in claim 7, further comprising a check valve positioned upstream of said sensor in the conduit.

12. An apparatus as recited in claim 7, wherein said valve is a ball valve.

13. An apparatus as recited in claim 7, wherein said first timer and said second timer can be manually reset to time zero.

14. An apparatus for selectively preventing the flow of a pressurized fluid through a conduit, comprising:

a sensor for generating a signal as the fluid flows through the conduit;

a valve for selectively preventing the flow of the fluid through the conduit;

a signal detector for sensing the signal generated by said sensor;

a first timer linked with said signal detector and said valve for measuring a predetermined time interval;

a second timer linked with said signal detector and said valve for selectively activating said valve to prevent flow of fluid through the conduit when said sensor detects a continuous fluid flow which exceeds a selected time interval and when the cumulative sum of all individual fluid flows within a predetermined time interval exceeds a selected amount; and a check valve positioned upstream of said sensor in the conduit.

15. An apparatus as recited in claim 14, wherein said valve is a ball valve.

16. An apparatus as recited in claim 14, wherein said first timer resets to time zero at the end of the predetermined time interval.

17. An apparatus as recited in claim 14, wherein said second timer resets to time zero at the end of the predetermined time interval if the cumulative sum of individual fluid flows within the predetermined time interval does not exceed the selected amount.

18. An apparatus as recited in claim 14, wherein said second timer resets to time zero if a single continuous flow exceeds a selected time interval.

19. An apparatus as recited in claim 14, wherein said first timer and said second timer can be manually reset to time zero.

20. An apparatus as recited in claim 14, wherein said sensor, valve, signal detector, first timer, and said second timer are constructed in a unitary apparatus which can be connected to the conduit.

* * * * *